(12) United States Patent
Yamauchi

(10) Patent No.: US 8,687,967 B2
(45) Date of Patent: Apr. 1, 2014

(54) OPTICAL TRANSCEIVER

(75) Inventor: Yusuke Yamauchi, Tokyo (JP)

(73) Assignee: NEC Corporation, Tokyo (JP)

( * ) Notice: Subject to any disclaimer, the term of this patent is extended or adjusted under 35 U.S.C. 154(b) by 60 days.

(21) Appl. No.: 13/314,471

(22) Filed: Dec. 8, 2011

(65) Prior Publication Data

US 2012/0148254 A1 Jun. 14, 2012

(30) Foreign Application Priority Data

Dec. 9, 2010 (JP) .................................. 2010-274863

(51) Int. Cl.
*H04B 10/00* (2013.01)

(52) U.S. Cl.
USPC ........................................ 398/135; 398/140

(58) Field of Classification Search
USPC ................................. 398/135, 140
See application file for complete search history.

(56) References Cited

U.S. PATENT DOCUMENTS

| | | | | |
|---|---|---|---|---|
| 7,204,710 B1 * | 4/2007 | Sato et al. | ...................... | 439/326 |
| 2007/0280603 A1 * | 12/2007 | Sakata et al. | ...................... | 385/88 |
| 2010/0150569 A1 * | 6/2010 | Umnov et al. | ................. | 398/139 |
| 2011/0135316 A1 * | 6/2011 | Fankhauser et al. | ........... | 398/164 |
| 2011/0164883 A1 * | 7/2011 | Hudgins et al. | ............... | 398/141 |

FOREIGN PATENT DOCUMENTS

| | | |
|---|---|---|
| JP | 7-210644 A | 8/1995 |
| WO | 2008108399 A | 9/2008 |

* cited by examiner

*Primary Examiner* — Nathan Curs

(57) ABSTRACT

To provide an optical transceiver with which a plurality of optical transmitters and receivers constituting the optical transceiver can be detached individually and exchanged/repaired easily, so that waste of components can be avoided. The optical transceiver includes: an optical transceiver main body; a plurality of pairs of optical transmitters and optical receivers housed inside the optical transceiver main body by being disposed in parallel; optical transmitter substrates and optical receiver substrates, which individually hold each of the optical transmitters and the optical receivers; an optical transceiver substrate which holds each of the optical transmitter substrates and the optical receiver substrates; and connectors which connect each of the optical transmitter substrates as well as the optical receiver substrates to the optical transceiver substrate detachably.

2 Claims, 7 Drawing Sheets

OPTICAL TRANSCEIVER

CROSS-REFERENCE TO RELATED APPLICATION

This application is based upon and claims the benefit of priority from Japanese patent application No. 2010-274863, filed on Dec. 9, 2010, the disclosure of which is incorporated herein in its entirety by reference.

BACKGROUND OF THE INVENTION

1. Field of the Invention

The present invention relates to an optical transceiver. More specifically, the present invention relates to an optical transceiver with which an optical transmitter/receiver of optical components can be exchanged individually and repaired easily when there is a fault generated in the optical components (optical transmitter and optical receiver) housed inside.

2. Description of the Related Art

As a full-scale broadband and ubiquitous-computing society is becoming established, information traffic amounts of trunk networks and subscriber networks are increased dramatically. Accordingly, a mass-storage and highly reliable optical communication system that can bear various kinds of applications is desired.

While various forms of optical communication systems have been developed, it is an important issue to be able to deal with faults of various kinds of optical components loaded on a substrate in any of such optical communication systems.

As an example of the optical communication system, there is known an optical module with which the module itself that conducts transmission and reception of data is replaced (see WO/2008/108399 (Patent Document 1), for example).

With the optical module disclosed in Patent Document 1, a light emitting element, a light receiving element, a transmission LSI, a reception LSI, and the like are loaded on a substrate, and the entire optical module is to be exchanged when there is a fault generated in the optical module.

Further, there is also known an optical communication card unit which includes driving condition data of optical transmission/reception elements loaded inside an optical module to make it easy to perform adjustment and exchange (see Japanese Unexamined Patent Publication Hei 7-210644 (Patent Document 2), for example).

With the optical communication card unit disclosed in Patent Document 2, a data input/output connector is provided on one end of the card, and a memory for storing data, a control section for controlling input/output of data, and an optical communication unit are provided on a substrate of the card.

Further, it is also desired to increase the transmission speed of an optical transceiver used as an optical transmission system.

As a method for increasing the transmission speed of the optical transceiver, a structure of transmitting optical signals of four wavelengths by bundling them into a single optical fiber has been studied. For example, "40 Gbps" can be implemented by transmitting four wavelengths of "10 Gbps" through a single optical fiber. In this case, four each of optical transmitters for transmitting optical signals and optical receivers for receiving optical signals are provided within the optical transceiver that can increase the transmission speed.

However, when there is a fault generated in a module of the optical module disclosed in Patent Document 1 described above, i.e., even in a case where there is a fault generated only in the light emitting element out of the light emitting element and the light receiving element of the module, the light receiving element having no fault is also exchanged since the module itself is replaced. Therefore, the components are to be wasted.

Further, when there is a fault generated in the optical communication card unit disclosed in Patent Document 2 described above, i.e., even in a case where there is a fault generated only in the light emitting element out of the light emitting element and the light receiving element of the card, the light receiving element having no fault is also exchanged since the card itself is replaced. Therefore, the components are to be wasted with the technique of Patent Document 2 as in the case of Patent Document 1.

Furthermore, when there is a fault generated in one of the optical transmitters/receivers of the optical transceiver which transmits optical signals of four wavelengths by bundling them in a single optical fiber, it is necessary to exchange the entire optical transceiver. Therefore, the components are to be wasted.

Further, even when the fault optical transmitter/receiver within the optical transceiver is detached, a new optical transmitter/receiver is loaded, and the optical transmitter/receiver is readjusted thereafter, a great amount of time is required for the repair.

In order to overcome each of aforementioned issues, it is therefore an exemplary object of the present invention to provide an optical transceiver with which a plurality of optical transmitters/receivers constituting the optical transceiver can be individually detached, exchanged, and repaired, so that waste of components can be avoided.

SUMMARY OF THE INVENTION

In order to achieve the foregoing exemplary object, the optical transceiver according to an exemplary aspect of the invention is characterized to include: an optical transceiver main body; a plurality of pairs of optical transmitters and optical receivers housed inside the optical transceiver main body by being disposed in parallel; optical transmitter substrates and optical receiver substrates, which individually hold each of the optical transmitters and the optical receivers; an optical transceiver substrate which holds each of the optical transmitter substrates and the optical receiver substrates; and connectors which connect each of the optical transmitter substrates as well as the optical receiver substrates to the optical transceiver substrate detachably.

DETAILED DESCRIPTION OF THE PREFERRED EMBODIMENTS

A first exemplary embodiment of an optical transceiver according to the present invention will be described hereinafter by referring to FIG. 1 to FIG. 5.

An optical transceiver 10 of this exemplary embodiment is designed to be able to easily conduct exchange and repair at the time of a failure generated in the optical transceiver 10 through making it possible to individually detach a plurality of optical transmitters/receivers constituting the optical transceiver 10.

Figure 1:
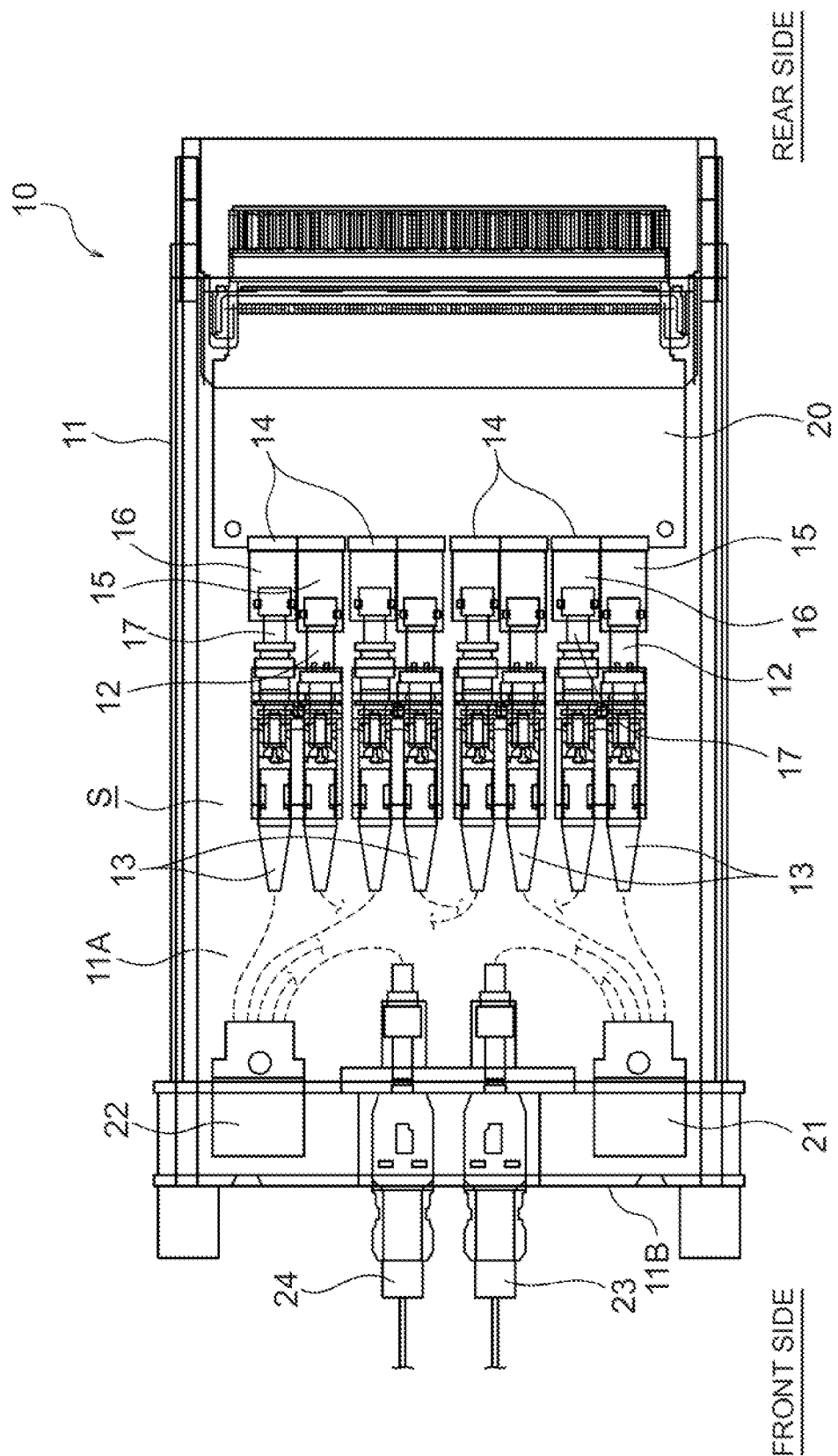
FIG. 1 is an overall plan view showing a first exemplary embodiment of an optical transceiver according to the present invention.

As shown in FIG. 1, the optical transceiver 10 according to the exemplary embodiment is structured by including an optical transceiver main body (simply referred to as a main body hereinafter) 11 whose plan shape is a rectangle.

In an inside space S of the main body 11, four each of optical transmitters 13 for transmitting optical signals and optical receivers 14 for receiving optical signals are disposed along the longitudinal direction of the main body 11 at a substantially equivalent interval in the width direction. That is, four pairs of the optical transmitters 13 and the optical receivers 14 are disposed in a parallel state.

In this exemplary embodiment, the optical transmitter 13 and the optical transmitter 14 are disposed alternately. However, it is not essential to dispose those alternately.

A laser diode 26 (see FIG. 4) for converting electric signals to optical signals is built inside those optical transmitters 13. Further, a photodiode 27 (see FIG. 5) for converting optical signals to electric signals is built inside the optical receivers 14.

A lid, not shown, is to be placed over the main body 11.

Each of the optical transmitters 13 and the optical receivers 14 is held by respective optical transmitter substrate 15 and optical receiver substrate 16.

Figure 2:
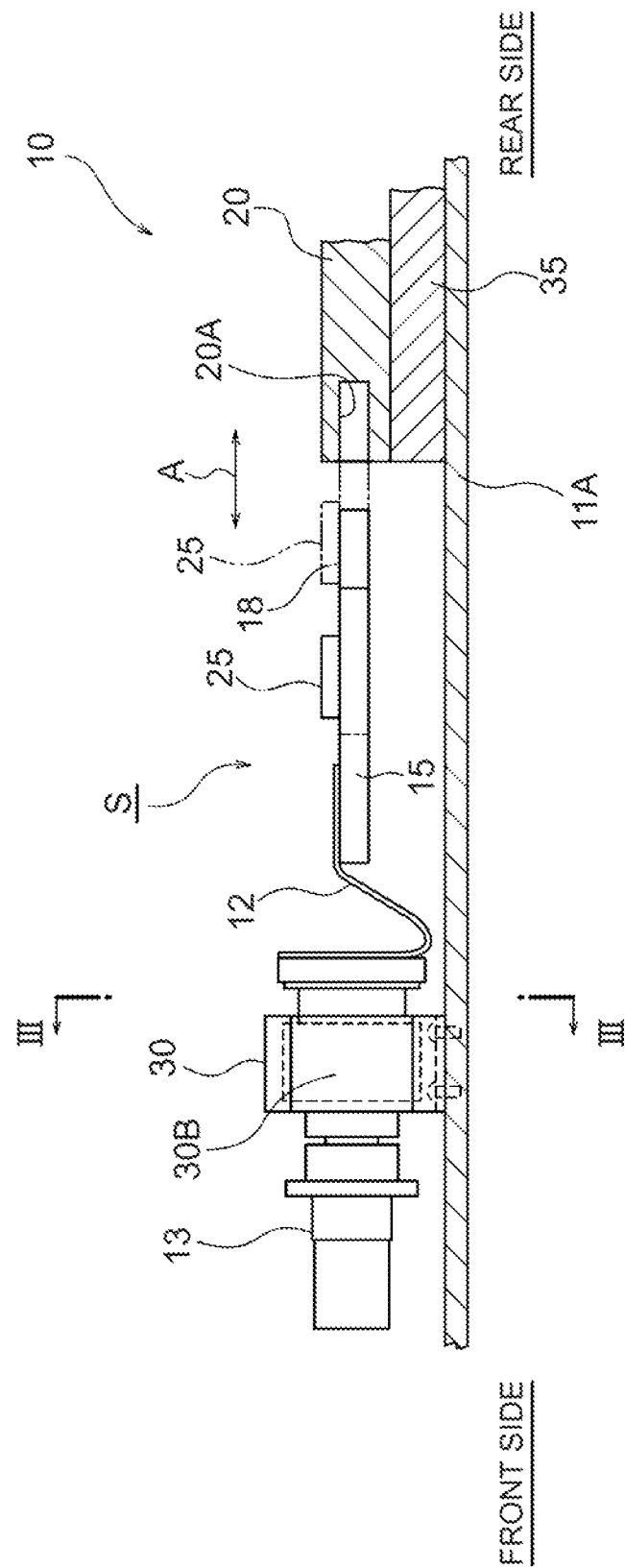
FIG. 2 is a schematic view showing a relationship regarding an optical transmitter, an optical transmitter substrate, and an optical transceiver substrate, which illustrates a state where the both substrates are isolated.
Figure 5:
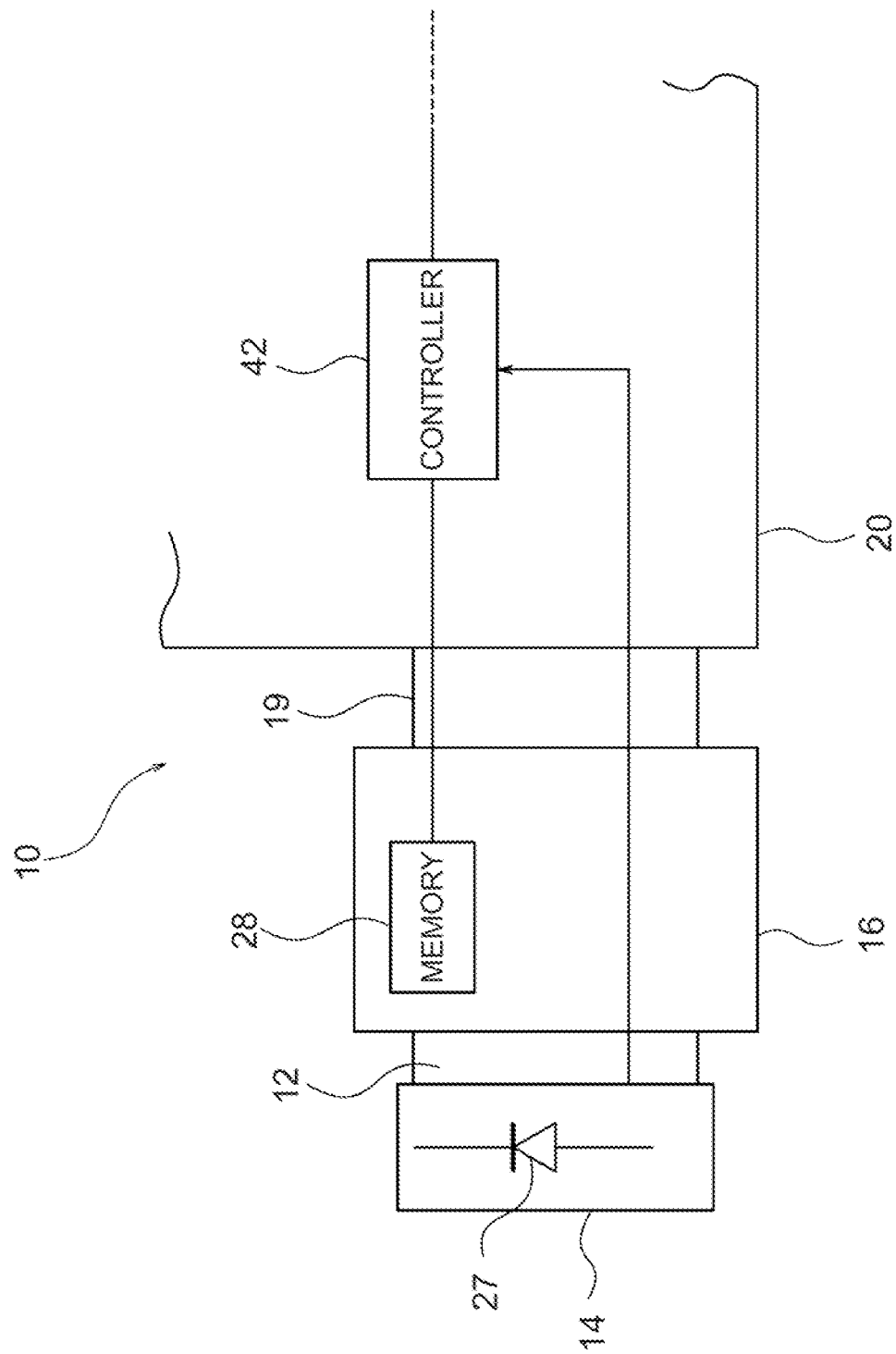
FIG. 5 is a block diagram showing a driving section of the optical receiver of the optical transceiver according to the exemplary embodiment.

Further, connectors 18 and 19 are connected to the optical transmitter substrate 15 and the optical to receiver substrate 16, respectively (see FIG. 2 and FIG. 5).

Figure 4:
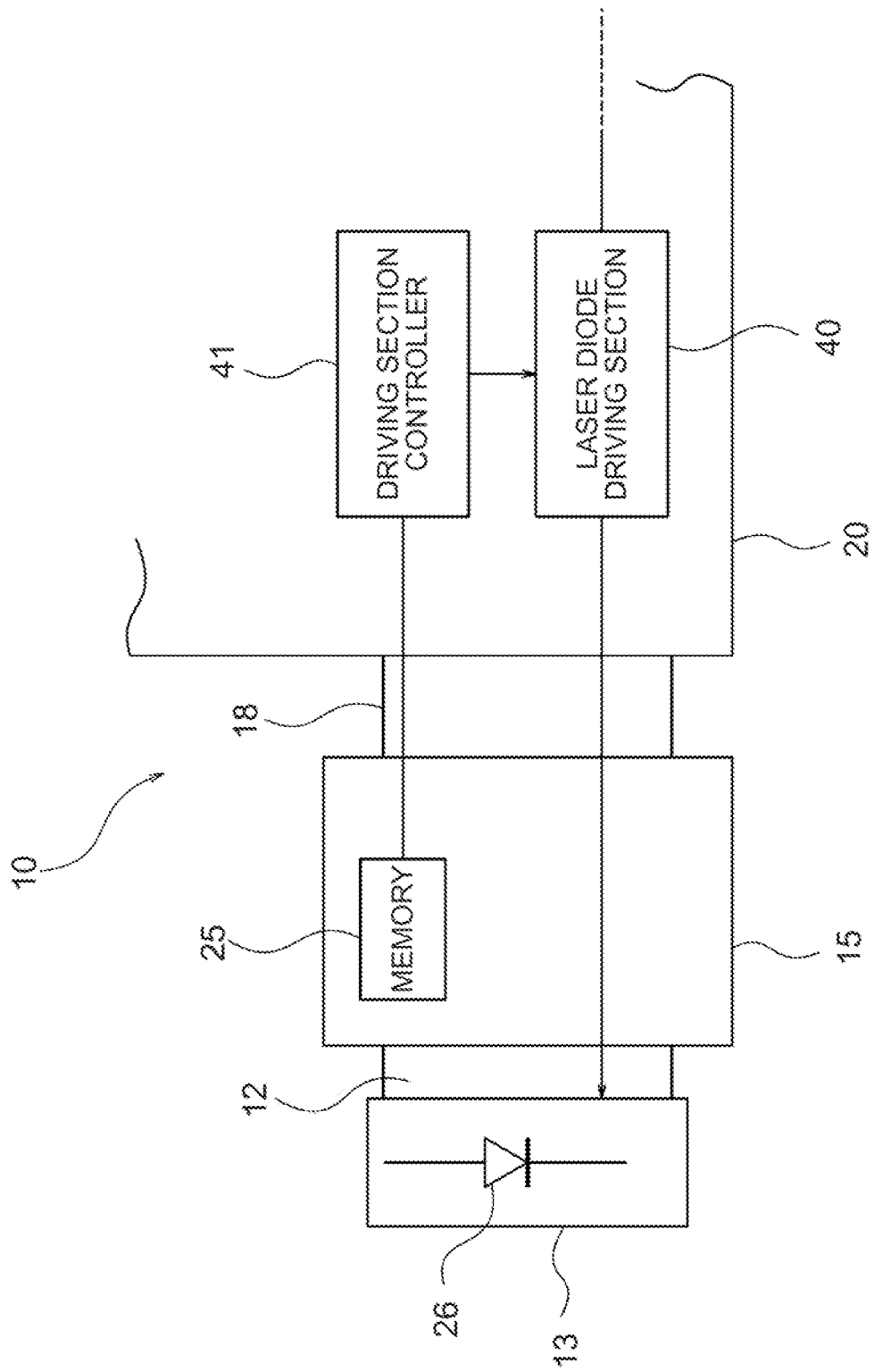
FIG. 4 is a block diagram showing a driving section of the optical transmitter of the optical transceiver according to the exemplary embodiment.

Furthermore, the connectors 18 and 19 are connected detachably to an optical transceiver substrate 20. This optical transceiver substrate 20 is formed in a substantially square shape as shown in FIG. 4, and provided by covering almost the whole region in the width direction of the main body 11.

The optical transmitters 13 and the optical receivers 14 are disposed on the front side (left side of FIG. 1) of the main body 11, while the optical transceiver 20 is disposed on the rear side (right side of FIG. 1).

An optical multiplexer 21 is provided on a bottom face 11A of the main body 11 closer to one of the flank side of the main body 11, and an optical demultiplexer 22 is provided on the bottom face 11A closer to the other flank side.

The optical multiplexer 21 transmits optical signals outputted from the four optical transmitters 13 by bundling them as a single optical fiber.

In the meantime, the optical demultiplexer 22 receives the optical signal inputted to the optical transceiver 10, separates the optical signal into four optical signals, and output each of those to the optical receivers 14. Such structure makes it possible to increase the transmission speed of the optical transceiver 10.

At positions closer to the front and center side of each of the optical transmitters 13 and the optical receivers 14 of the main body 11 and away by a prescribed distance from the optical multiplexer 21 and the optical demultiplexer 22, a transmission connector 23 and a reception connector 24 are provided with a prescribed distance provided therebetween in the width direction of the main body 11. The transmission connector 23 transmits the optical signal to the outside via the optical multiplexer 21. The reception connector 24 receives the optical signal inputted to the optical transceiver 10 from the outside, and outputs the received optical signal to the optical demultiplexer 22.

As described above, the four optical transmitters 13 are connected to the optical multiplexer 21 and the four light receivers 14 are connected to the optical demultiplexer 22, respectively, by the optical signals via the fibers. Further, the optical multiplexer 21 is connected to the transmission connector 23 and the optical demultiplexer 22 is connected to the reception connector 24, respectively, by the optical signal via the fibers.

Next, the connection state between one optical transmitter 13 out of a plurality of optical transmitters 13 and the optical transceiver substrate 20 will be described by referring to FIG. 2. The optical transmitter 13 and the optical transceiver substrate 20 are housed in the inside space S of the main body 11 as described above.

The optical transmitter 13 is held to the optical transmission substrate 15 via a flexible wiring 12. The optical transmission substrate 15 is formed in a square plan shape as shown in FIG. 4, and a memory 25 is formed on the top face thereof.

The driving conditions of the optical transmitter 13 such as adjusting values of the drive current and the like by each of the temperatures of the optical transmitter 13 are saved in the memory 25. Further, as shown in FIG. 1, the optical transmitter 14 is held to the optical receiver substrate 16 via a flexible wiring 17.

Therefore, when the optical transmitter substrate 15 is connected to the optical transceiver substrate 20, a driving section controller 40 provided to the optical transceiver substrate 20 reads information stored in the memory 25 to fetch the adjusting values of the driving current and the like of the optical transmitter 13.

As shown in FIG. 2, a connection port 20A is formed on one end face of the connector 18 side of the optical transceiver substrate 20, and the connector 18 can be inserted and pulled out by being moved in the front and rear directions of the optical transceiver 10 as shown by arrows A.

The connection port 20A corresponds to each of the connectors 18 and 19 connected to each of the four pairs of the optical transmitters 13 and the optical receivers 14.

Figure 3:
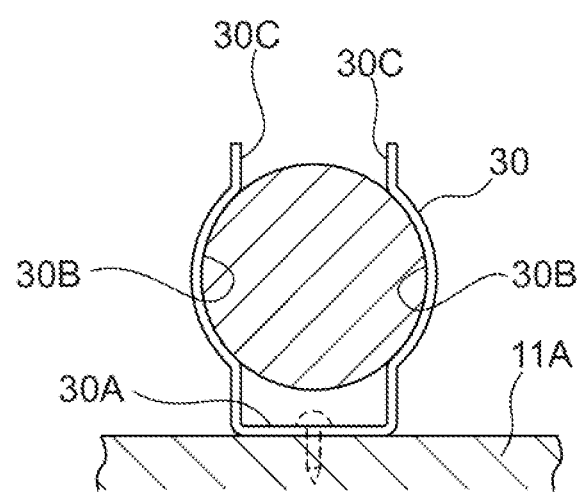
FIG. 3 is a sectional view taken along a line of FIG. 2.

The optical transmitter 13 is fixed to the main body 11 by an optical transmitter support member 30 shown in FIG. 2 and FIG. 3.

That is, the optical transmitter support member 30 is formed with a spring member such as SUS, and formed in a shape which includes a level bottom face 30A, clamping sections 30B with a substantially a half-moon sectional shape formed to rise upwards from the both ends of the bottom face 30A and formed in the midway, and opening sections 30C formed on the upper side of the clamping sections 30B.

The clamping sections 30B are formed to be able to clamp and fix the maximum diameter part of the round-shape optical transmitter, for example.

The inside diameter of the clamping sections 30B is formed to be in a size slightly smaller than the outer diameter of the maximum diameter part of the optical transmitter 13. Thus, when the maximum diameter of the optical transmitter 13 is pushed into the clamping sections 30B, it is tightly clamped by the clamping sections 30B. As a result, the optical transmitter 13 can be fixed more securely.

Further, the size of the opening between the upper-side opening sections 30C of the optical transmitter support members 30 is formed to be slightly smaller than the outer diameter of the maximum diameter part of the optical transmitter support member 30, and the size between the area from the lower end of the clamping section 30B to the bottom face 30A is formed to be a substantially same size as the size of the opening between the upper-side opening sections 30C. Thus, when fixing the optical transmitter 13 to the optical transmitter support member 30, the maximum diameter part of the optical transmitter 13 may be located and pushed into the upper-side opening sections 30C of the optical transmitter support member 30 to widen the upper-side opening sections 30C, and then the optical transmitter 13 may be pushed in until reaching the narrowed bottom part of the optical transmitter support member 30. Thereby, the optical transmitter 13 can be fixed securely since the maximum diameter part thereof is tightly clamped by the clamping sections 30B of the optical transmitter support member 30.

After the optical transmitter 13 is attached and fixed to the optical transmitter support member 30, the connector 18 supported by the flexible wiring 12 is inserted to the connection port 20A of the optical transceiver substrate 20 to connect the optical transmitter substrate 15 and the optical transceiver substrate 20.

To detach the optical transmitter 13 from the optical transmitter support member 30, the part of the optical transmitter 13 other than the maximum diameter section may simply be grasped and pulled out upwards.

As described above, the optical transmitter support member 30 is formed with a spring member and formed in a shape having the upper-side opening sections 30C, so that it is easily detached. Further, the optical transceiver substrate 20 is attached to the bottom face 11A of the main body 11 via a pedestal plate 35 by fastening a nut or the like.

Next, the structure and operations of the driving section of the optical transceiver 10 according to the exemplary embodiment will be described.

FIG. 4 shows the structure of the driving section of the optical transceiver 10.

The memory 25 is loaded to the optical transmitter substrate 15 as described above, and the laser diode 26 is built inside the optical transmitter 13 as described above.

In the meantime, a laser diode driving section 40 and a driving section controller 41 for controlling the laser diode control section 40 are provided to the optical transceiver substrate 20. The memory 25 and the driving-section controller 41 are connected electrically, and the laser diode 26 and the laser-diode driving section 40 are connected electrically as well.

Thus, when the optical transmitter substrate 25 is connected to the optical transceiver substrate 20, the memory 25 is read by the driving section controller 41 provided on the optical transceiver substrate 20, and the adjusting values and the like of the optical transmitter 13 are fetched. Then, the optical transmitter 13 is driven optimally while the laser diode driving section 40 is being controlled by the driving section controller 41 based on the information containing inputted sound electric signals.

In FIG. 4, the optical transmitter substrate 25 and the optical transceiver substrate 20 are connected via the connector 18.

Next, exchange of the optical transmitter 13 and the like when there is a fault generated in the optical transceiver 10 will be described.

Note here that the fault generated in the optical transceiver 10 is alarm-displayed by the laser diode driving section 40. In this case, which of the four optical transmitters 13 and the four optical receivers 14 in the optical transceiver 10 is having a fault can be known.

In a case where a fault generated in the optical transmitter 13 of the optical transceiver 10 is alarm-displayed, for example, the user first detaches the lid of the main body 11, and pulls out the connector 18 connected to the optical transmitter 13 and the optical transmitter substrate 25 from the connector connection port 20A of the optical transceiver substrate 20.

Then, the user grasps the part of the optical transmitter 13 other than the maximum diameter part and pulls the optical transmitter 13 upwards to take out and detach it from the optical transmitter support member 30.

Thereafter, a new optical transmitter 13 and a new memory 25 prepared in advance and set in the same specifications as those of the optical transmitter 13 and the memory 25 are loaded to the optical transmitter support member 30, and a connector 18 provided to the optical transmitter 13 is connected to the connector connection port 20A of the optical transceiver substrate 20 to complete the exchange of the new optical transmitter 13.

At last, the lid of the main body 11 is attached so that the optical transceiver 10 can be in a useable state again.

Next, the structure of the driving section of each of the optical receivers 14 will be described by referring to FIG. 5.

As described above, the photodiode 27 which receives the optical signals outputted from the optical demultiplexer 22 and reads the optical signals by converting those to the electric signals is built inside the optical receiver 14.

The optical receiver 14 is held to the optical receiver substrate 16 via a flexible wiring similar to the flexible wiring 12 shown in FIG. 2. The connector 19 is connected to the optical receiver substrate 16, and the optical receiver substrate 16 can be detachably connected to the optical transceiver substrate 20 by the connector 19.

A memory 28 is loaded to the optical receiver substrate 16, and the driving conditions of the optical receiver 14 such as adjusting values of the drive current and the like by each of the temperatures are saved in the memory 28.

Further, a controller 42 which reads the information stored in the memory 28 and performs a simple control such as a control of the voltage of the photodiode 27 is loaded to the optical transceiver substrate 20. Sound electric signals and the like are outputted from the controller 42.

The optical receiver 14 is also attached to the main body 11 detachably by an optical receiver support member, not shown, which is in a same structure as that of the optical transmitter support member 30.

Following effects can be achieved with the optical transceiver 10 in the structure described above.

(1) When there is a fault generated in one of a plurality of optical transmitters/receivers 13 and 14 constituting the optical transceiver 10, each of the optical transmitter substrate 15, the optical receiver substrate 16, and the optical transceiver substrate 20 can be detached individually via the connectors 18 and 19. Therefore, only the fault transmitter/receiver 13 or 14, for example, can be exchanged easily. As a result, the optical transceiver 10 can be repaired easily.

(2) It is only necessary to exchange the fault optical transmitter/receiver 13 or 14, so that it is unnecessary to exchange the optical transmitters/receivers 13 and 14 having no fault. Thereby, waste of components can be avoided.

(3) The optical transmitter support member 30 which fixes the optical transmitter 13 detachably is formed with a spring member in a shape having the upper-side opening sections 30C and the clamping sections 30B for clamping the optical transmitter 13, and the inside diameter of the clamping sections 30B is formed to be in a size slightly smaller than the outer diameter of the maximum diameter part of the optical transmitter 13. Thus, the optical transmitter 13 can be tightly clamped, so that it can be fixed more securely.

(4) The optical transmitter support member 30 is formed with a spring member and has the upper-side opening sections 30C. Thus, when detaching the optical transmitter 13 from the optical transmitter support member 30, the optical transmitter 13 can be detached by simply grasping the part of the optical transmitter 13 other than the maximum diameter part and pulling it upwards. This makes it easy to detach the optical transmitter 13.

The optical transceiver of the present invention is structured in the manner described above. Therefore, as an exemplary advantage according to the invention, when there is a fault generated in one of a plurality of the optical transmitters/receivers constituting the optical transceiver, the optical transmitter substrate, the optical receiver substrate, and the optical transceiver substrate can be detached via the connector individually. Thus, only the fault optical transmitter/receiver can be exchanged easily. As a result, waste of the components can be avoided since it is only necessary to exchange the fault optical transmitter/receiver and unnecessary to exchange the optical transmitters/receivers having no fault.

Further, since only the fault optical transmitter/receiver needs to be exchanged, it is easy to conduct the repair.

Next, a second exemplary embodiment of the optical transceiver according to the present invention will be described by referring to FIG. 6.

Figure 6:
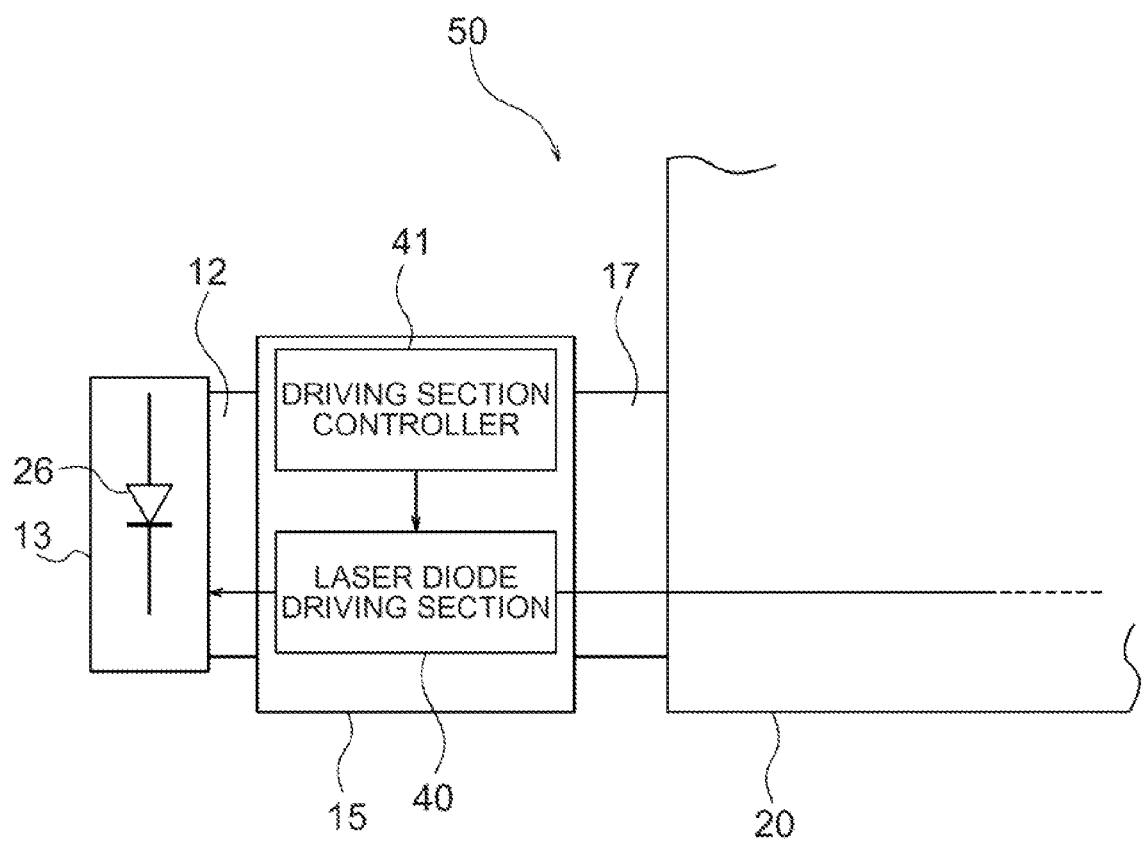
FIG. 6 is a block diagram showing a driving section of an optical transmitter of the optical transceiver according to a second exemplary embodiment.

Regarding an optical transceiver 50 according to the second exemplary embodiment shown in FIG. 6, only different members are to be described while same reference numerals are applied to the members that are same as the structural members of the optical transceiver 10 of the first exemplary embodiment.

In the optical transceiver 50 according to the second exemplary embodiment, the laser diode driving section 40 and the driving section controller 41 are provided to the optical transmitter substrate 15. The memory 25 is not provided to the optical transmitter substrate 15.

With the optical transceiver 50 of the second exemplary embodiment in the structure described above, substantially the same effects as the effects described in (1) to (5) can be achieved as well.

Next, a third exemplary embodiment of the optical transceiver according to the present invention will be described by referring to FIG. 7.

Figure 7:
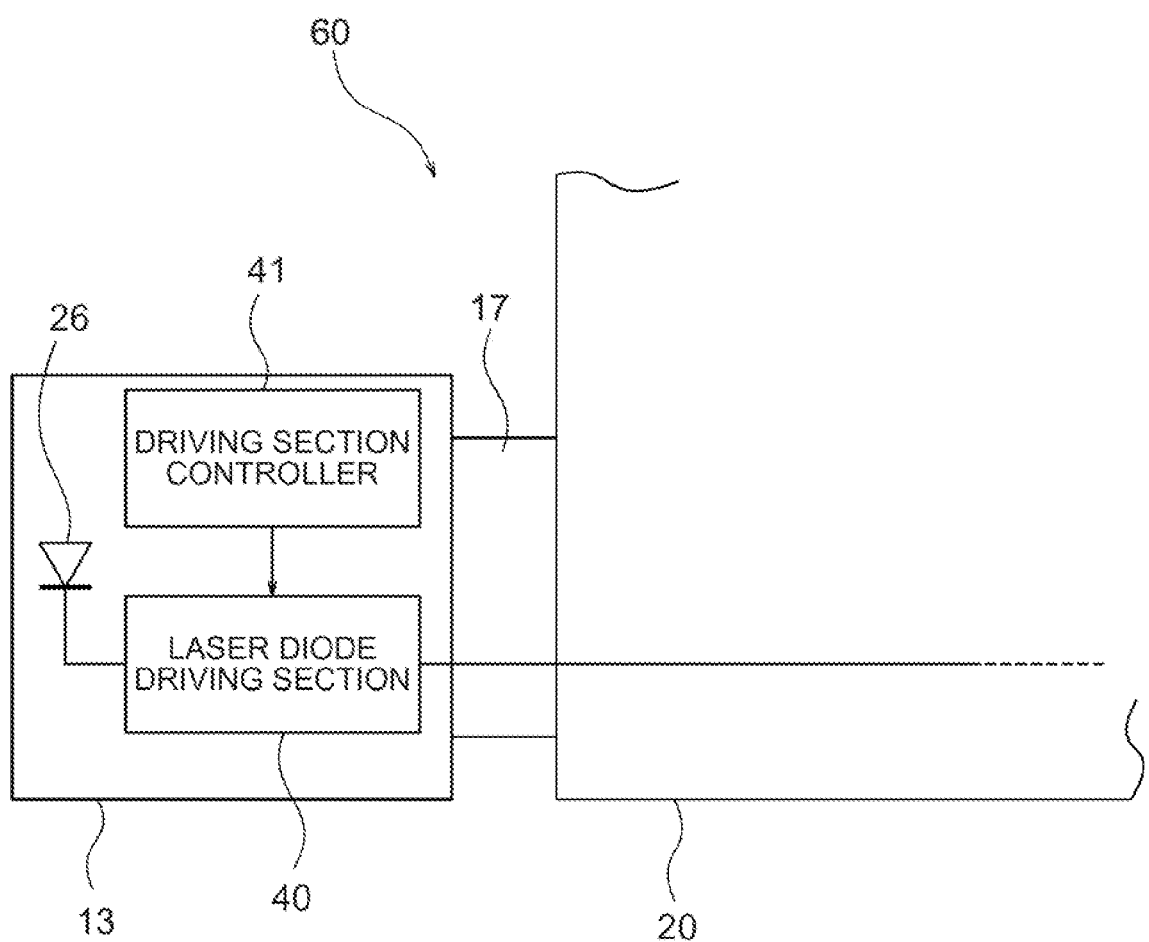
FIG. 7 is a functional block diagram of an optical transmitter according to a third exemplary embodiment of the optical transceiver according to the present invention.

Regarding an optical transceiver 60 according to the third exemplary embodiment shown in FIG. 7, only different members are to be described while same reference numerals are applied to the members that are same as the structural members of the optical transceivers 10 and 50 of the first and second exemplary embodiments.

In the optical transceiver 60 according to the third exemplary embodiment, the laser diode driving section 40 and the driving section controller 41 are provided to the optical transmitter 13. With the optical transceiver 60 of the third exemplary embodiment in the structure described above, substantially the same effects as the effects described in (1) to (5) can be achieved as well.

While the present invention has been described above by referring to each of the exemplary embodiments, the present invention is not limited only to each of those exemplary embodiments. Various changes and modifications occurred to those skilled in the art can be applied to the structures and details of the present invention. Further, the present invention includes combinations of a part of or a whole part of the structures of each of the above-described embodiments.

For example, while the optical transceiver 10 in each of the exemplary embodiments is structured to include four each of the optical transmitters 13 and the optical receivers 14, the present invention is not limited only to such case. More than four, e.g., five each of the optical transmitters 13 and the optical receivers 14, or less than four, e.g., three each of the optical transmitters 13 and the optical receivers 14, may be disposed. The point is that the structure makes it possible to detach a plurality of optical transmitters 13 and optical receivers 14 individually.

The whole or part of the exemplary embodiments disclosed above can be described as, but not limited to, the following Supplementary Notes.

(Supplementary Note 1)

An optical transceiver that includes: an optical transceiver main body; a plurality of pairs of optical transmitters and optical receivers housed inside the optical transceiver main body by being disposed in parallel; optical transmitter substrates and optical receiver substrates, which individually hold each of the optical transmitters and the optical receivers; an optical transceiver substrate which holds each of the optical transmitter substrates and the optical receiver substrates; and connectors which connect each of the optical transmitter substrates as well as the optical receiver substrates to the optical transceiver substrate detachably.

(Supplementary Note 2)

The optical transceiver as depicted in Supplementary Note 1, wherein: each of the optical transmitters includes a laser diode that outputs a laser beam; each of the optical transmitter substrates includes a memory that stores a driving condition of each of the optical transmitters; and the optical transceiver substrate includes a laser diode driving section that drives the laser diode and a driving section controller that controls drive of the laser diode driving section.

(Supplementary Note 3)

The optical transceiver as depicted in Supplementary Note 1 or 2, which includes an optical transmitter support member that fixes each of the optical transmitters in an individually detachable manner, which is provided on a bottom face of the main body.

(Supplementary Note 4)

The optical transceiver as depicted in Supplementary Note 1, wherein: each of the optical transmitters includes a laser diode; and each of the optical transmitter substrates includes a laser diode driving section that drives the laser diode and a driving section controller that controls drive of the laser diode driving section.

(Supplementary Note 5)

An optical transceiver that includes: an optical transceiver main body; a plurality of pairs of optical transmitters and optical receivers housed inside the main body by being disposed in parallel; an optical transceiver substrate which holds each of the optical transmitter substrates and the optical receiver substrates; and connectors which connect each of the optical transmitter substrates as well as the optical receiver substrates to the optical transceiver substrate detachably, wherein each of the optical transmitters includes: a laser diode that dispatches a laser beam; a laser diode driving section that drives the laser diode; and a driving section controller that controls drive of the laser diode driving section.

Industrial Applicability

The present invention can be utilized for repairing a fault optical transmitter/receiver, when there is a fault generated in one of a plurality of optical transmitters/receivers provided to an optical transceiver.

What is claimed is:

1. An optical transceiver, comprising:
   an optical transceiver main body;
   a plurality of pairs of optical transmitters and optical receivers housed inside the optical transceiver main body by being disposed in parallel;
   optical transmitter substrates and optical receiver substrates, which individually hold each of the optical transmitters and the optical receivers;
   an optical transceiver substrate which holds each of the optical transmitter substrates and the optical receiver substrates; and
   connectors which connect each of the optical transmitter substrates as well as the optical receiver substrates to the optical transceiver substrate detachably, wherein:
   each of the optical transmitters includes a laser diode that outputs a laser beam;
   each of the optical transmitter substrates includes a memory that stores a driving condition of each of the optical transmitters; and
   the optical transceiver substrate includes a laser diode driving section that drives the laser diode and a driving section controller that controls drive of the laser diode driving section.

2. An optical transceiver, comprising:
   an optical transceiver main body;
   a plurality of pairs of optical transmitters and optical receivers housed inside the optical transceiver main body by being disposed in parallel;
   optical transmitter substrates and optical receiver substrates, which individually hold each of the optical transmitters and the optical receivers;
   an optical transceiver substrate which holds each of the optical transmitter substrates and the optical receiver substrates; and
   connectors which connect each of the optical transmitter substrates as well as the optical receiver substrates to the optical transceiver substrate detachably, wherein:
   each of the optical transmitters includes a laser diode that outputs a laser beam; each of the optical transmitter substrates includes a memory that stores a driving condition of each of the optical transmitters; and
   the optical transceiver substrate includes a laser diode driving section that drives the laser diode and a driving section controller that controls drive of the laser diode driving section,
   and wherein the optical transceiver further comprises an optical transmitter support member that fixes each of the optical transmitters in an individually detachable manner, which is provided on a bottom face of the main body.

* * * * *